United States Patent
Ferrero et al.

(12) 
(10) Patent No.: US 6,662,652 B1
(45) Date of Patent: Dec. 16, 2003

(54) ALTIMETER HAVING CORRECTABLE DIGITIZER AND METHOD OF USE

(75) Inventors: John Ferrero, Chatsworth, CA (US); Hugh W. Smith, Tujunga, CA (US)

(73) Assignee: Trans-Cal Industries, Inc., Van Nuys, CA (US)

( * ) Notice: Subject to any disclaimer, the term of this patent is extended or adjusted under 35 U.S.C. 154(b) by 0 days.

(21) Appl. No.: 10/165,157

(22) Filed: Jun. 5, 2002

Related U.S. Application Data (63) Continuation-in-part of application No. 09/538,322, filed on Mar. 30, 2000, now abandoned.

(51) Int. Cl.[7] .............................................. G01L 7/12
(52) U.S. Cl. ......................................................... 73/387
(58) Field of Search ........................... 73/384, 386, 387, 73/1.63, 1.64, 1.62, 1.61, 178 R, 179; 701/4, 10

(56) References Cited

U.S. PATENT DOCUMENTS 5,532,698 A * 7/1996 Nielsen et al. ................ 73/386

* cited by examiner

Primary Examiner—John E. Chapman
(74) Attorney, Agent, or Firm—Timothy Thut Tyson; Ted Masters; Freilich, Hornbaker & Rosen (57) ABSTRACT

An altimeter (24) of the aneroid type having a correctable digitizer 26 is shown. When the pilot sets the altimeter to the local barometric pressure, the correctable digitizer is also set to the local barometric pressure. An input device (58) connected between the barometric pressure correction control (66) and the digitizer (62) generates a barometric pressure correction signal (67) which is routed to digitizer (62). Barometric pressure correction signal (67) modifies the aircraft altitude output value of digitizer (62) to a corrected aircraft altitude output value (68) which is routed to one or more external navigation systems (70).

8 Claims, 7 Drawing Sheets

ALTIMETER HAVING CORRECTABLE DIGITIZER AND METHOD OF USE

CROSS REFERENCE TO RELATED APPLICATION

This application is a Continuation in Part of application Ser. No. 09/538,322, filed Mar. 30, 2000, now abandoned, which is included herein in its entirety by reference.

TECHNICAL FIELD

The present invention pertains to devices for measuring the altitude of an aircraft, and in particular to an altimeter having a digitizer correctable to barometric pressure.

BACKGROUND ART

Air traffic control systems utilize transponders installed within an aircraft to monitor the position and altitude of aircraft flying within controlled airspace. The transponder is a transceiver which, when interrogated by an air traffic control radar station, replies with an identification code input by the pilot and the pressure altitude of the aircraft referenced to sea level (29.92 inches of mercury). This pressure altitude information is provided by an altitude measuring and reporting device. Three fundamental types of altitude reporting devices are in use today: (1) air data computers, (2) encoding altimeters, and (3) altitude digitizers. The air data computer is a device which uses various sensors and micro processing techniques to determine altitude, airspeed, position and numerous other parameters which affect aircraft performance. Air data computers are highly accurate, extremely sensitive, and very expensive to purchase and maintain.

Figure 1:
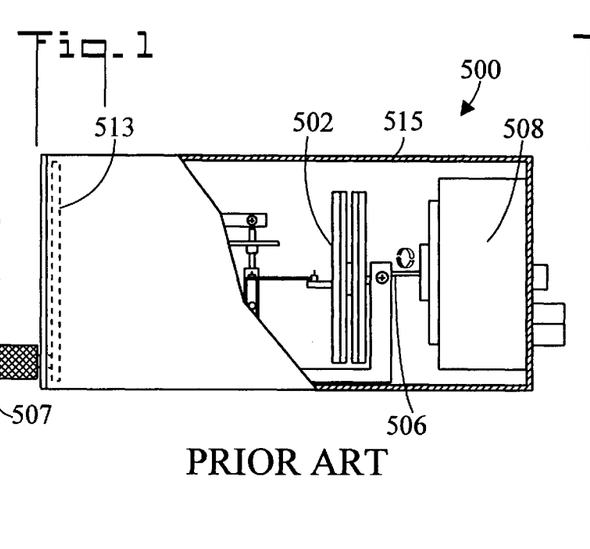
FIG. 1 is a cutaway side elevation view of a prior art encoding altimeter.
Figure 2:
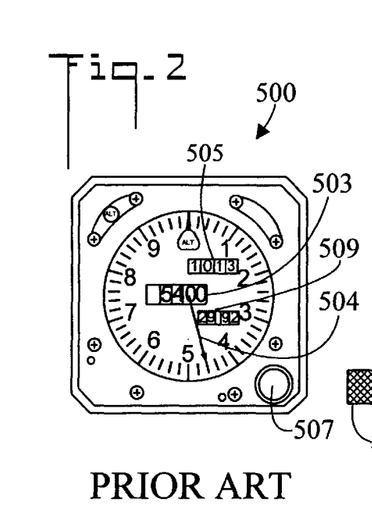
FIG. 2 is a front elevation view of the prior art encoding altimeter.
Figure 3:
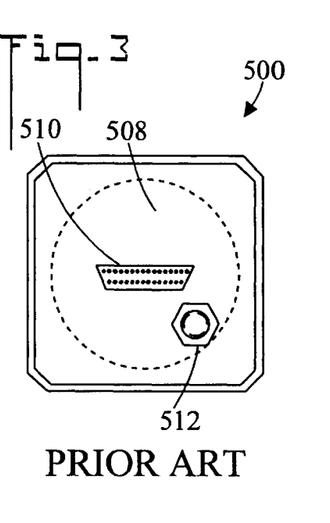
FIG. 3 is a rear elevation view of the prior art encoding altimeter.

Encoding altimeters are much less expensive. FIGS. 1–3 illustrated cutaway side elevation, end elevation, and opposite end elevation views, respectively, of a conventional prior art encoding altimeter, generally designated 500. Altimeter 500 is an electromechanical device which uses a pressure sensitive mechanical movement in the form of an aneroid 502 to sense outside air pressure. Aneroid 502 is in a sealed housing 515 connected to a static pressure line through a port 512. The aneroid 502 drives a series of gears which in turn drive a pointer 504 and a numbered counter drum 503 which provides the pilot with an altitude reading. Pointer 504 makes one revolution for each 1000 feet of altitude. Counter drum 503 indicates the altitude of the aircraft to the nearest 100 feet. Pointer 504 and counter drum 503 are both used to read altitude. Counter drum 503 provides the most significant digits and pointer 504 provides the least significant digits. The aneroid 502 is also mechanically linked 506 to a shaft angle encoder 508 which provides a digitized representation of the aircraft's altitude to a transponder via a connector 510.

Altimeter 500 has two counter drums 505 and 509 which the pilot sets to the barometric pressure provided by air traffic control over the radio. Counter drum 505 indicates sea level barometric pressure in isobars and counter drum 509 indicates sea level barometric pressure in inches of mercury with 29.92 inches being nominal. When the pilot hears the barometric pressure over the radio, he looks to see if the readings on the drums 505 and 509 are correct. If not, he uses a barometric pressure reference correction control in the form of knob 507 to set the readings to the barometric pressure. When knob 507 is turned, gears inside mechanically move the readings on the drums 505 and 509. In FIG. 1, the barometric pressure is represented as being 29.92 inches of mercury and the altitude is 5460 with 5400 feet shown on drum 503 and 460 feet shown by needle 504.

Figure 4:
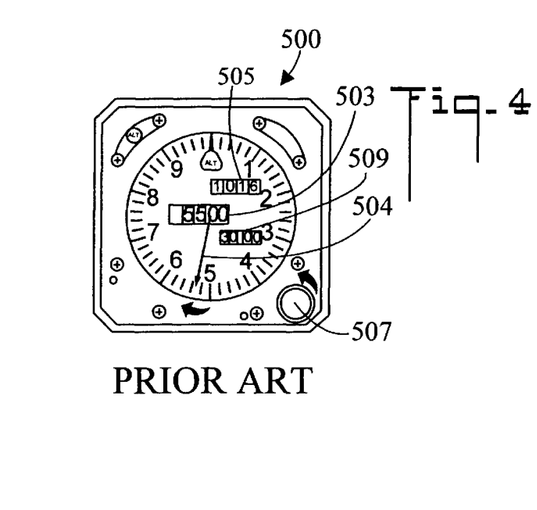
FIG. 4 is a front elevation view of the encoding altimeter changed for a barometric pressure reference of 30.00 inches of mercury.

FIG. 4 illustrates the changes which result when altimeter 500 is set to a different barometric pressure. In FIG. 4, the pilot has moved knob 507 to increase the setting of barometric pressure on drum 509 to 30.00 inches of mercury. Indicated altitude is changed thereby to 5532 feet with 5500 feet shown on drum 503 and 532 shown by needle 504. Counter drum 505 showing isobars has also moved to 1016. Thus a change of 0.08 inches of mercury in barometric pressure results in a 72 foot correction in indicated altitude.

It should be noted that this altitude correction is not made in the shaft angle encoder 508. This is because air traffic control prefers to receive a raw altitude indication from aircraft instead of one which is subject to errors created by the pilot. Air traffic control adjusts the raw altitude indication provided by the transponder from the shaft angle encoder using the barometric pressure at the location of the aircraft to establish the true altitude of the aircraft.

Figures 5, 6:
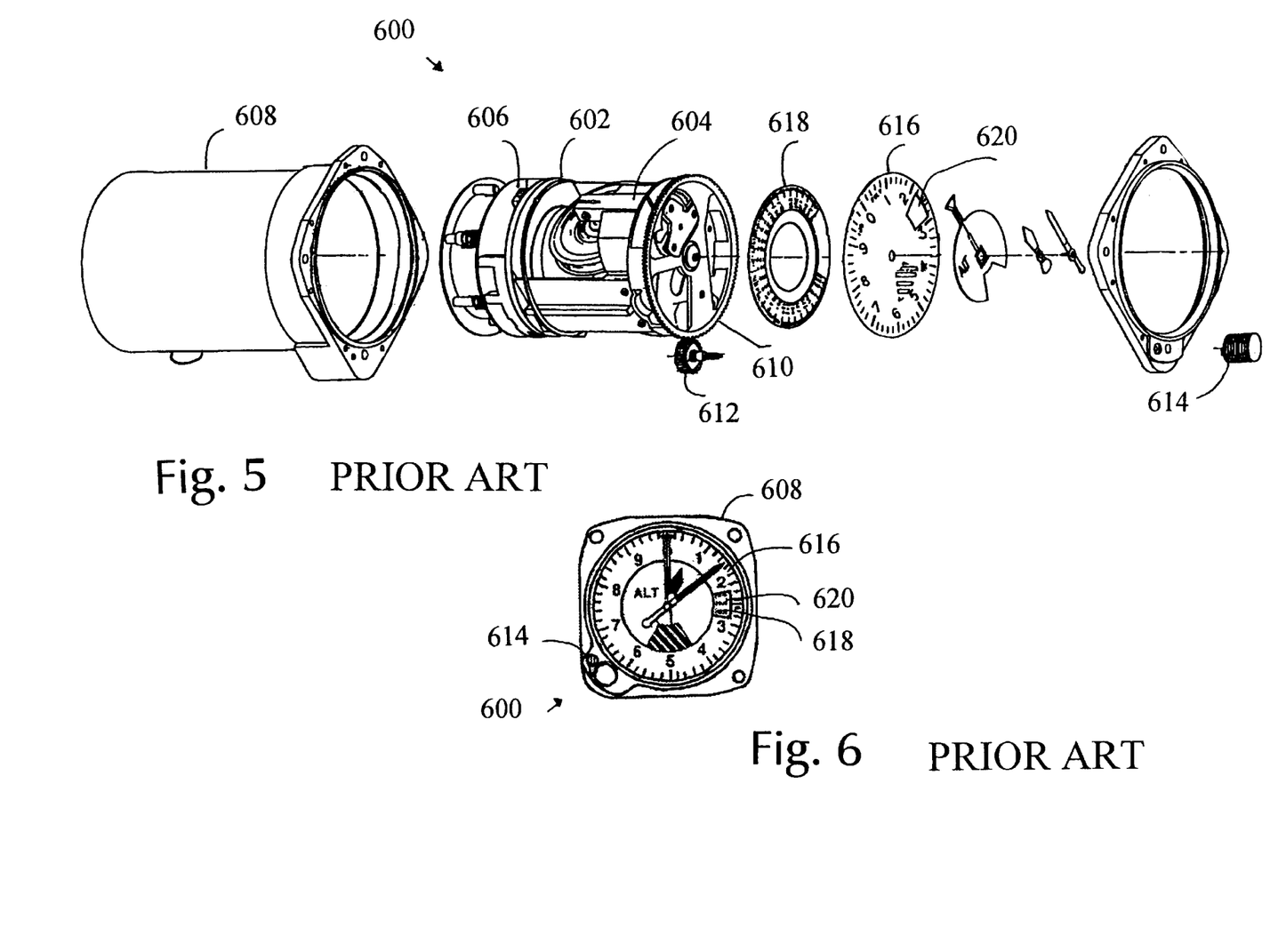
FIG. 5 is an exploded front, right side, perspective view of a second prior art encoding altimeter.
FIG. 6 is a front elevation view of the altimeter of FIG. 5.

FIGS. 5 and 6 show another form of prior art encoding altimeter generally designated 600, which is a Series 5035 encoding altimeter sold by United Instruments, Incorporated, 3625 Comatara Avenue, Wichita, Kans. 67226. FIG. 5 is a front, right side, exploded perspective view and FIG. 6 is a front elevation view. This encoding altimeter has a frame 602 which carries an altimeter section 604 and encoder 606 and rotates inside a housing 608. The previous encoding altimeter of FIGS. 1–4 has multiple gears and shafts for adjusting the setting of the barometric pressure. The present encoding altimeter has only two gears: a ring gear 610 at the perimeter of the frame 602 and a driver gear 612 connected to knob 614. When the pilot turns the knob, the ring gear turns the frame in relation to a face 616 which is fixed to the housing 608. A pressure setting dial 618 fixed to the front of the frame shows through a window 620 in the face to show the pilot the barometric pressure setting.

The encoder 606 is not adjusted by the pilot when he moves the knob 614. As in the previous encoding altimeter, the encoder 606 only provides a raw pressure indication to the transponder which is interpreted by air traffic control using the barometric pressure at the location of the aircraft.

Altitude digitizers may also be completely independent of the altimeter and may either be electromechanical or solid state in nature. The FAA requires that such an altitude digitizer be calibrated to within ±125 feet of the primary altimeter viewed by the pilot. U.S. Pat. No. Re. 29,436 illustrates an electromechanical digitizer mechanically linked to an aneroid. A shaft angle encoder converts angular position into a digital code representing altitude. Here again, this device is expensive and difficult to calibrate. Solid state digitizers are disclosed in U.S. Pat. No. 4,106,343, and Model SSD 120 Altitude Encoder/Digitizer, sold by Trans-Cal Industries, Inc., 16141 Cohasset Street, Van Nuys, Calif. 91406. These devices have a solid state pressure transducer which converts air pressure to voltage which is then converted to a digital code representing altitude. These devices are much less expensive than electromechanical shaft angle encoding digitizers.

Figure 7:
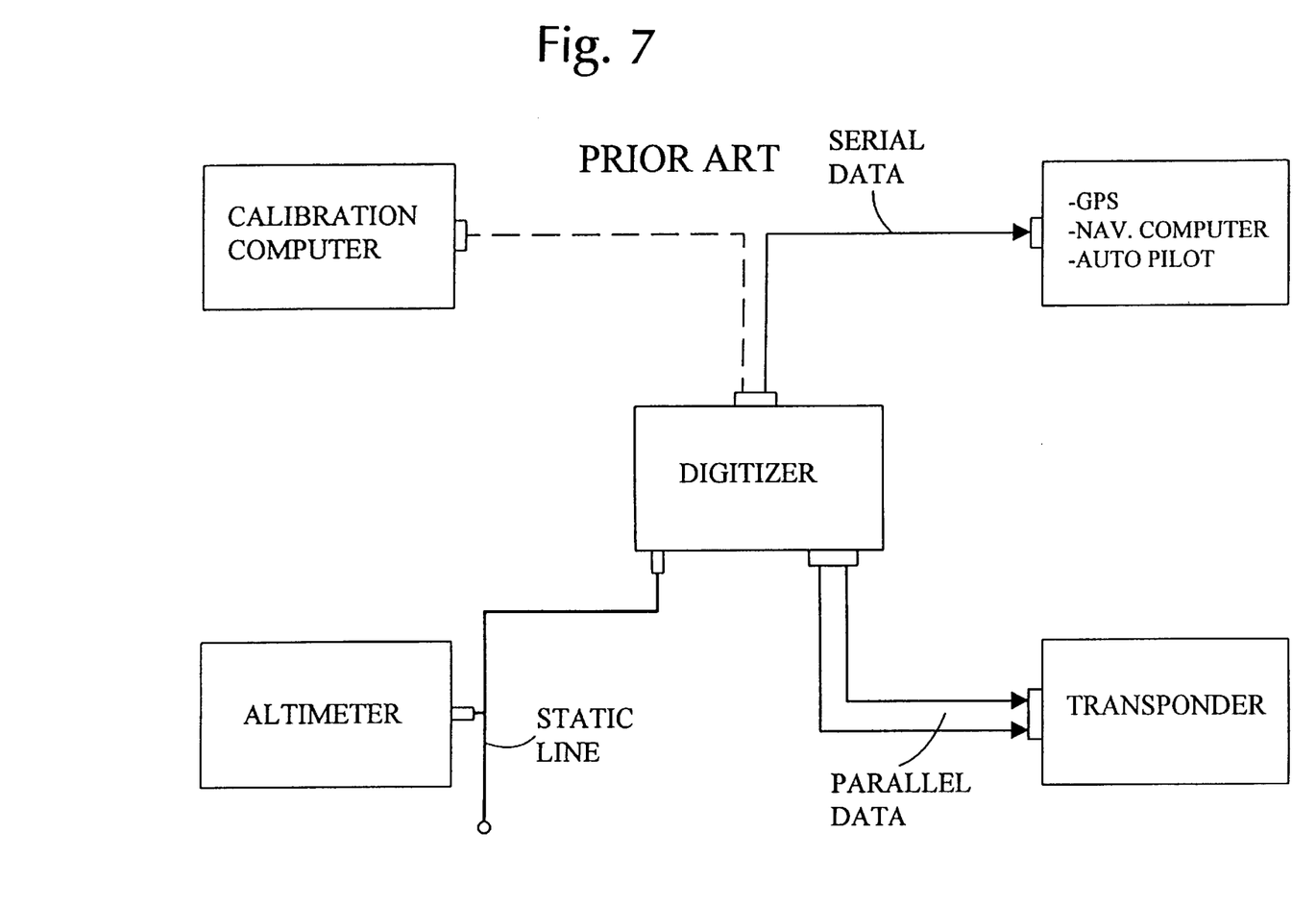
FIG. 7 is a block diagram of a solid state digitizer in a typical aircraft system.

FIG. 7 is a block diagram of a solid state digitizer in a typical aircraft system. The digitizer and altimeter are connected to different portions of the static pressure line. The output of the solid state digitizer is routed in parallel form to the aircraft's transponder, and in serial form to a Global Positioning System (GPS) navigational computer, where it serves as a backup altitude signal should the GPS solution become degraded when less than four satellites are available for determination of an accurate altitude

DISCLOSURE OF INVENTION

The present invention is directed to an improved altitude measuring device including an altimeter having a digitizer output corrected for barometric pressure. The present invention has the following advantages over previous devices:

since the digitizer output is corrected for barometric pressure, the output can be used by each of the receiving navigation system devices without the pilot having to adjust the barometric pressure on each device; and, the digitizer altitude output is the same as the indicated altimeter altitude.

In accordance with a preferred embodiment of the invention, the altimeter having a correctable digitizer includes a conventional altimeter of the aneroid type, having a housing, a pressure sensitive mechanical movement disposed within the housing, and a barometric pressure correction control, such as a knob, disposed outside the housing. A digitizer is also located within the altimeter housing and generates an aircraft altitude output value based upon sensed air pressure. An input device is connected between the barometric pressure correction control and the digitizer, so that when the barometric pressure correction control is changed, the input device generates a barometric pressure correction signal which is delivered to the digitizer. The barometric pressure correction signal is used to modify the aircraft altitude output value of the digitizer to result in a corrected aircraft altitude output value which is routed to one or more external navigation systems.

In accordance with an important aspect of the invention, the barometric pressure correction control includes a knob and the input device includes a rotary shaft input which is mechanically linked to the knob so that when the knob is rotated, the shaft input rotates.

In accordance with an important feature of the invention, the input device includes a rotary potentiometer and an analog-to-digital converter.

In accordance with another important aspect of the invention, the corrected aircraft altitude output value of the digitizer is a serial data stream.

In accordance with another important feature of the invention, the corrected aircraft altitude output value makes it unnecessary for the pilot or crew member to adjust each of the external navigation systems for actual reference barometric pressure.

In accordance with another important aspect of the invention, the barometric pressure correction signal ensures that the altitude delivered to the external navigation system by the digitizer is the same as the altitude seen by the pilot on the altimeter.

Other features and advantages of the present invention will become apparent from the following detailed description, taken in conjunction with the accompanying drawings, which illustrate, by way of example, the principles of the invention.

MODES FOR CARRYING OUT THE INVENTION

Figure 8:
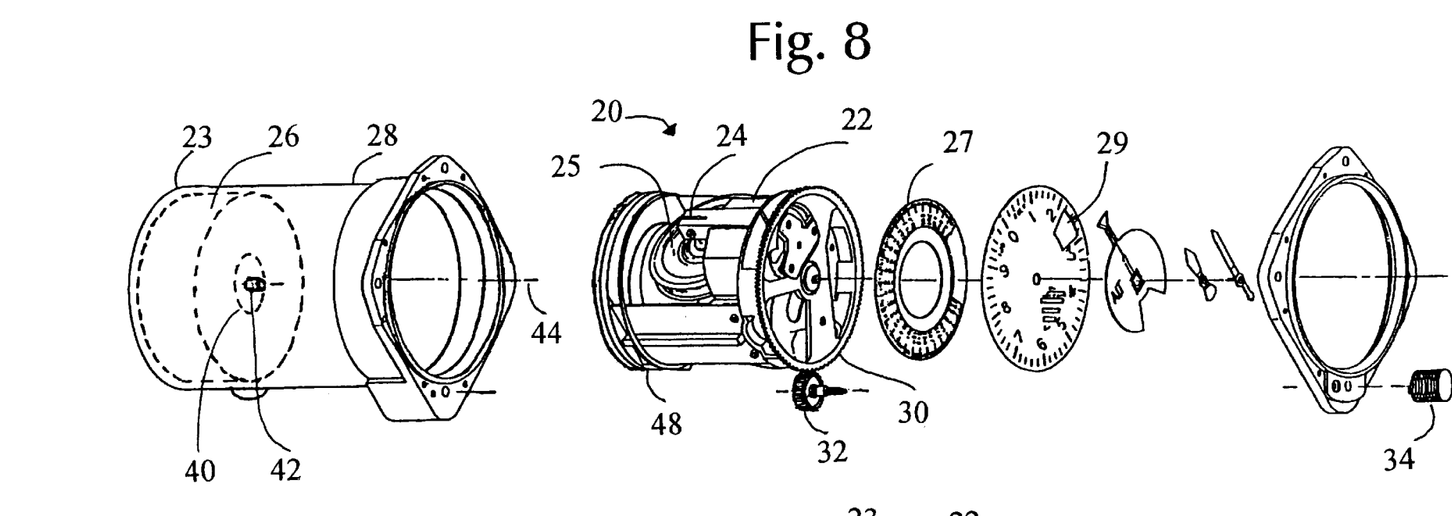
FIG. 8 is an exploded front, right side, perspective view of an altimeter having a correctable digitizer in accordance with the present invention.

FIG. 8 is an exploded front, right side, perspective view of an altitude measuring device including an altimeter having a correctable digitizer in accordance with the present invention, generally designated 20. The altimeter is a modification of the altimeter 600 of FIGS. 5 and 6. The encoder of the previous altimeter is removed including part of the frame structure for supporting the encoder and a correctable digitizer 26 is mounted in the rear 23 of the housing 28 as indicated by the dotted lines. The digitizer is correctable by means of a rotary potentiometer 40 having a shaft 42 aligned with the axis of rotation 44 of the frame 22. A shaft collar 46 on an adapter 48 attached to the back of the frame 22 couples the altimeter 24 to the correctable digitizer 26 when the frame is installed in the housing 28 as shown below in FIG. 10. Then when the pilot sets the barometric pressure on the altimeter 24 which is of the pressure sensitive mechanical type having an aneroid 25, he also sets or corrects the digitizer 26. Specifically, when knob 34 of the barometric pressure correction control is rotated, it moves a driving gear 32 that rotates a ring gear 30 mounted on the frame 22 rotating the entire frame. The resulting barometric pressure reference readout or setting is visible on a pressure setting dial 27 attached to the frame 22 and visible to the pilot through a window 29. Prior to adjusting the altimeter, the pilot has monitored the current barometric pressure by checking with air traffic control for the current reading at the local area ground station. He then sets the reference readout to the local barometric pressure. The remaining elements of the altimeter are the same as they are in the altimeter of FIGS. 5 and 6.

Figure 9:
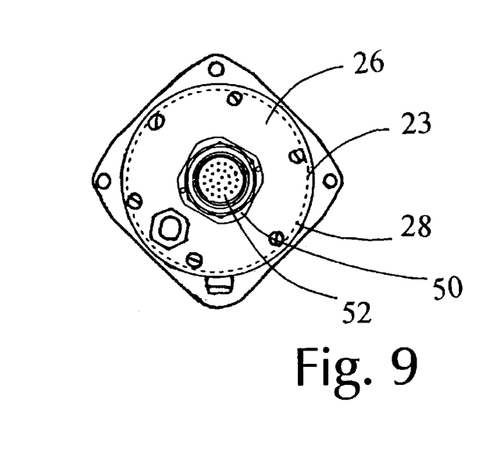
FIG. 9 is a rear elevation view of the altimeter of FIG. 8.

FIG. 9 is a rear elevation view of the correctable digitizer 26 mounted in the rear 23 of the housing 28. Correctable digitizer 26 generates an altitude output based upon sensed air pressure inside housing 28. Correctable digitizer 26 has a hermetically sealed jam nut connector 50 of the type MS3114-H16C-26PN or equivalent connecting correctable digitizer 26 to housing 28. The pins 52 of connector 50 are accessible from outside the housing for use by a mating connector and associated cabling to a transponder, GPS navigation device, Navigation Computer, auto pilot, calibration computer, or the like.

Figure 10:
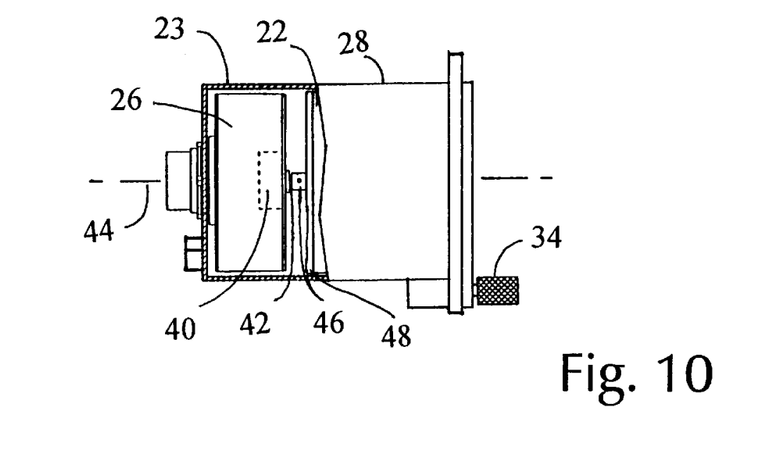
FIG. 10 is a cutaway side elevation view of the altimeter of FIG. 8.

FIG. 10 is a cutaway side elevation view of the assembled altimeter having the correctable digitizer. The correctable digitizer 26 is mounted in the rear 23 of the housing 28. The shaft 42 of the rotary potentiometer 40 protrudes forward along the axis of rotation 44 of the frame where a shaft collar 46 on the adapter 48 attached to the back of the frame 22 engages the shaft. When the pilot rotates the frame 22 by means of the knob 34, driving gear 32, and ring gear 30, the shaft 42 of the potentiometer 40 also rotates to correct the barometric setting of the digitizer.

Figure 11:
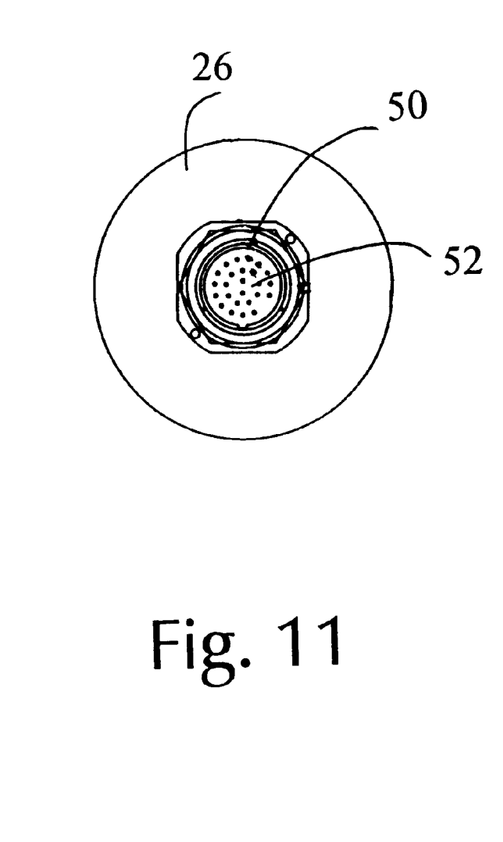
FIG. 11 is a rear elevation view of the correctable digitizer.

FIG. 11 is a rear elevation view of the correctable digitizer 26 prior to assembly into the housing 28. The jam nut connector 50 has a plurality of pins 52 for connection to external aircraft navigation systems.

Figure 12:
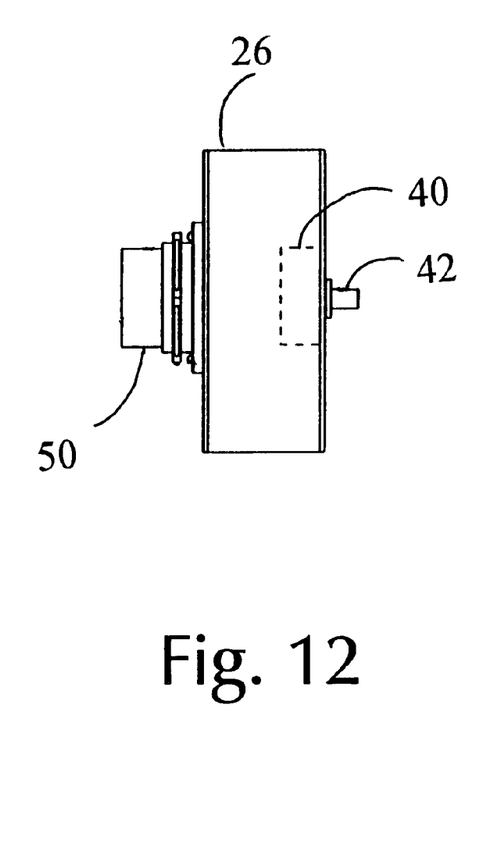
FIG. 12 is a side elevation view of the correctable digitizer.

FIG. 12 is a side elevation of the correctable digitizer 26. The rotary potentiometer 40 is part of the assembly and includes the shaft 42 protruding forward. The connector 50 is in the rear.

Figure 13:
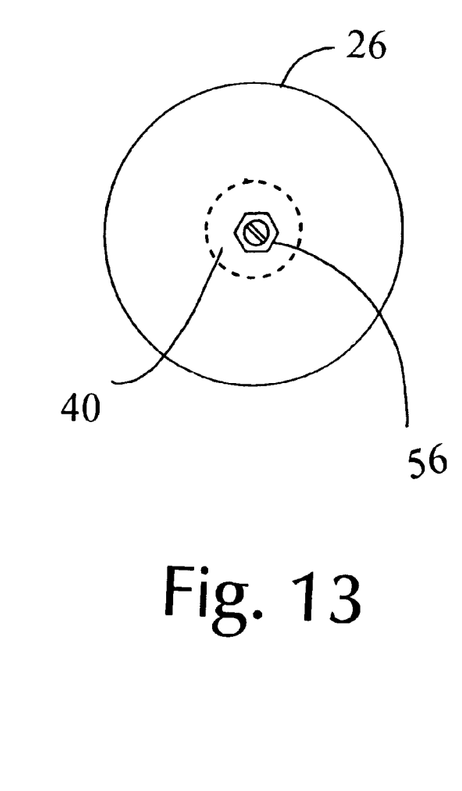
FIG. 13 is a front elevation view of the correctable digitizer.

FIG. 13 is a front elevation view of the correctable digitizer 26. The digitizer has the rotary potentiometer 40 with the shaft 42 held in place by a nut 56.

Figure 14:
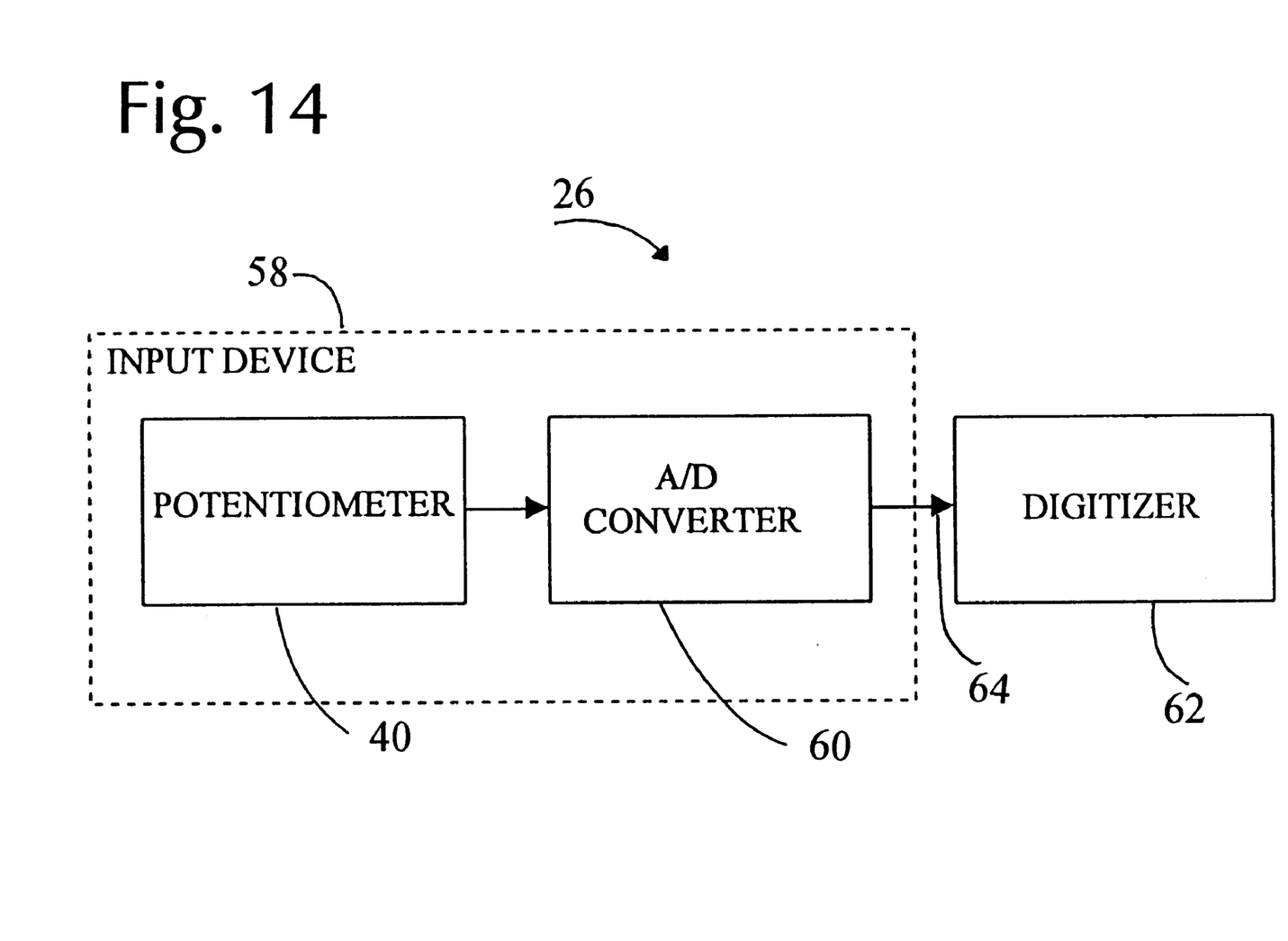
FIG. 14 is a block diagram of the correctable digitizer.

FIG. 14 is a block diagram of the correctable digitizer 26. The correctable digitizer 26 includes an input device 58 which includes the rotary potentiometer 40 and an analog-to-digital converter 60. The digital output is then passed to a digitizer 62 as a barometric pressure correction signal 64 which modifies the altitude signal to include the correction for barometric pressure. Firmware within the correctable digitizer adds or subtracts the correction signal from the uncorrected altitude produced by the digitizer to create the corrected aircraft altitude output value. It may be appreciated that other forms of input device such as a shaft angle encoder could also be employed.

Figure 15:
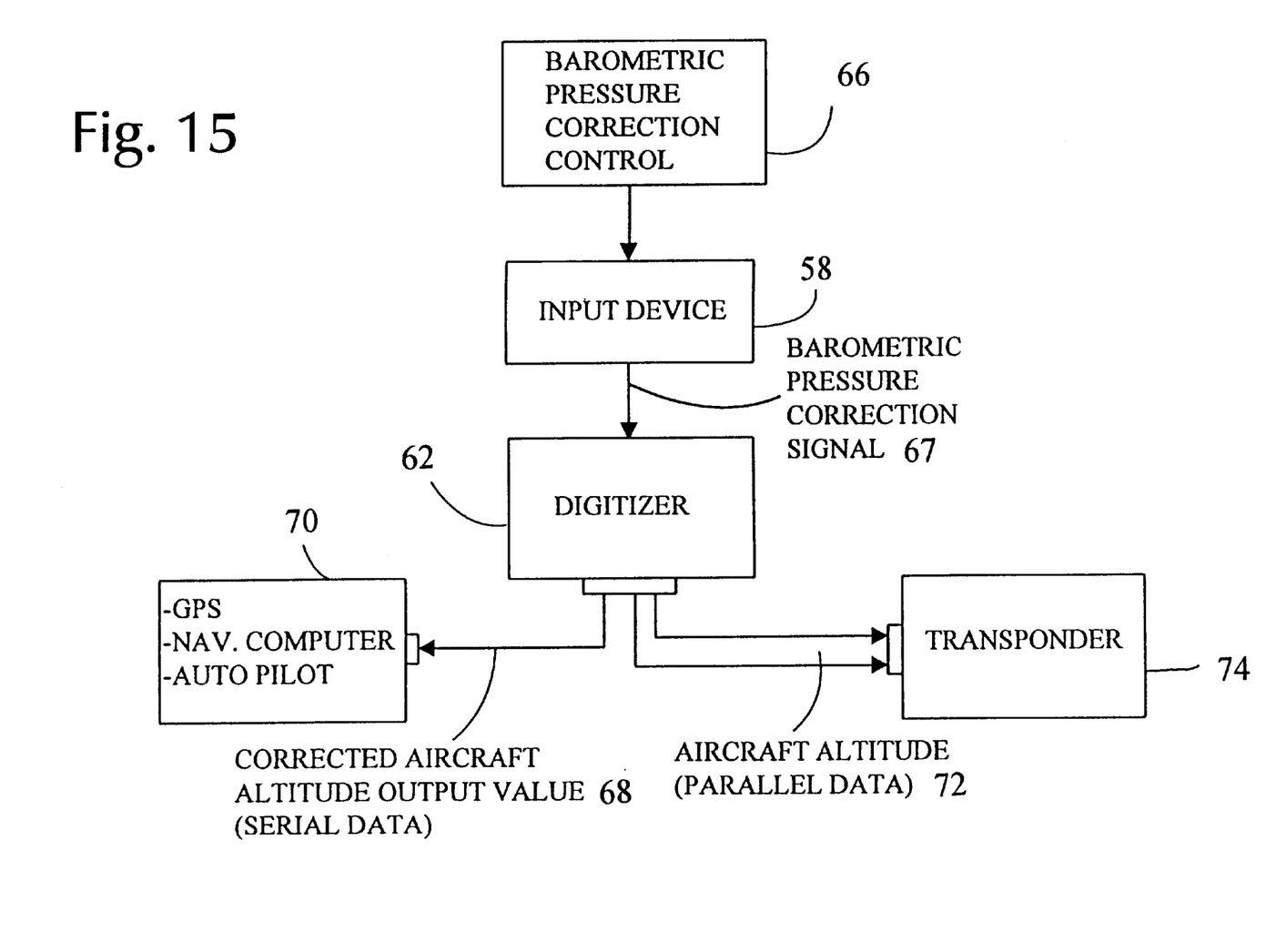
FIG. 15 is a block diagram of an altimeter having a correctable digitizer in a typical aircraft system.

FIG. 15 is a block diagram of an altimeter having a correctable digitizer in a typical aircraft system. The barometric pressure correction control 66 is used by the pilot to enter the correct barometric pressure into the system. In the process, the barometric pressure correction control rotates the input device 58. The barometric pressure correction signal 67 created by the input device 58 is passed to the digitizer 62. The digitizer 62 creates two outputs. The corrected aircraft altitude output value 68 having the actual aircraft altitude is routed as serial data to external navigation systems 70 such as (1) a global positioning system, (2) a navigation computer, and (3) an auto pilot as serial data. The corrected aircraft altitude output value 68 obviates the need to adjust each of the external navigation system 70 devices for actual reference barometric pressure as was required in the past. Additionally, the altitude which the pilot sees on the altimeter is substantially the same as the corrected aircraft altitude output value. As in the past, the digitizer 62 also continues to provide an uncorrected aircraft altitude 72 as parallel data to the transponder 72 for use by air traffic control.

A method for correcting an altitude measured by an altimeter includes:

providing an external navigation system 70;

providing an altimeter 20 of the aneroid type, the altimeter having a housing 28, a pressure sensitive mechanical movement 24 disposed within the housing, a barometric pressure reference readout 27, and a barometric pressure reference correction control 34 disposed outside housing 28;

providing a digitizer 26 disposed within housing 28, the digitizer generating an aircraft altitude output value based upon sensed air pressure;

providing an input device 58 connected to the barometric pressure correction control 34 and the digitizer 26 so that when the barometric pressure correction control 34 is changed, input device 58 generates a barometric pressure correction signal 67 which is routed to the digitizer 62, the barometric pressure correction signal 67 is used to modify the aircraft altitude output value of the digitizer 26 to result in a corrected aircraft altitude output value 68;

monitoring actual barometric pressure such as at a local area ground station;

changing the barometric pressure correction control 34 until the barometric pressure reference readout 27 corresponds to actual barometric pressure thereby causing the barometric pressure correction signal 67 routed to the digitizer 62 to be corrected; and, the digitizer 26 providing a corrected aircraft altitude output value 68 to external navigation systems 70.

The preferred embodiments of the invention described herein are exemplary and numerous modifications, dimensional variations, and rearrangements can be readily envisioned to achieve an equivalent result, all of which are intended to be embraced within the scope of the appended claims.

We claim:

1. An altitude measuring device, comprising:

an altimeter of the aneroid type, having a housing, a pressure sensitive mechanical movement disposed within said housing, and a barometric pressure correction control disposed outside said housing;

a digitizer disposed within said housing, said digitizer generating an aircraft altitude output value based upon sensed air pressure;

means for modifying said aircraft altitude output value of said digitizer including an input device connected to said barometric pressure correction control and said digitizer, so that when said barometric pressure correction control is changed, said input device generates a barometric pressure correction signal which is routed to said digitizer;

said barometric pressure correction signal modifying said aircraft altitude output value of said digitizer to result in a corrected aircraft altitude output value; and, means for routing said corrected aircraft altitude output value from said digitizer to an external navigation system.

2. An altitude measuring device according to claim 1, further including:

said barometric pressure correction control including a knob;

said input device including a shaft input which is mechanically linked to said knob; and, so that when said knob is rotated, said shaft input rotates.

3. An altitude measuring device according to claim 1, further including:

said input device including a potentiometer and an analog-to-digital converter.

4. An altitude measuring device according to claim 1, further including:

said corrected aircraft altitude output value of said digitizer including serial data.

5. An altitude measuring device according to claim 1, further including:

the external navigation system being at least one of (1) a global positioning system, (2) a navigation computer, and (3) an auto pilot.

6. An altitude measuring device according to claim 1, further including:

said altimeter having a readout of aircraft altitude; and, said altimeter readout of aircraft altitude being substantially equal to said corrected aircraft altitude output value.

7. An altitude measuring device according to claim 1, further including:

said digitizer not mechanically coupled to said pressure sensitive mechanical movement of said altimeter.

8. A method for correcting an altitude measured by an altimeter:

providing an external navigation system;

providing an altimeter of the aneroid type, said altimeter having a housing, a pressure sensitive mechanical movement disposed within said housing, a barometric pressure reference readout, and a barometric pressure reference correction control disposed outside said housing;

providing a digitizer disposed within said housing, said digitizer generating an aircraft altitude output value based upon sensed air pressure;

providing an input device connected to said barometric pressure correction control, said input device connected to said digitizer, so that when said barometric pressure correction control is changed, said input device generates a barometric pressure correction signal which is routed to said digitizer, said barometric pressure correction signal modifying said aircraft altitude output value of said digitizer to result in a corrected aircraft altitude output value;

monitoring actual barometric pressure;

changing said barometric pressure correction control until said barometric pressure reference readout corresponds to said actual barometric pressure thereby causing said barometric pressure correction signal routed to said digitizer to be corrected; and, said digitizer providing a corrected aircraft altitude output value to said external navigation system.

\* \* \* \* \*